3,094,060
APPARATUS FOR STORING FERMENTABLE LIQUIDS
Yves Menoret, Montreuil sous Bois, and Roger Gautheret, Paris, France, assignors to Societe en nom collectif Pernod & Ricard, Paris, France
Filed July 6, 1960, Ser. No. 41,185
3 Claims. (Cl. 99—269)

This invention relates to the storage of fermentable liquids and is more especially directed to the storage of fruit juices under sterile conditions in large-capacity tanks.

The problem of storing fruit juices, and other fermentable liquids, from the time of preparation to that of delivery is an economically important one.

Among the methods heretofore used for preventing deterioration of the juice in storage, has been the addition of sulfite to the juice, but this is generally regarded as objectionable. Other known methods include, storage at reduced temperature in an atmosphere of high pressure carbon dioxide; and storage at ordinary temperature in sterile tanks.

Storage at ordinary temperature in sterile tanks, with sulfuric acid absorbing means in the tank for absorbing any air bubbles that may enter the tank on contraction of the volume of juice, is especially convenient. The juice may either be introduced into the tank while still hot as it issues from the pasteurizing unit, or it may first be allowed to cool, and then loaded into the tanks under sterile conditions.

While this latter method of filling the tanks usually gives the best results, it presents a number of difficulties. In the first place, it sometimes occurs that the spores of certain fungi of heat resistant character are retained in the juice after pasteurization, and in such case they will develop and thrive at the free liquid surface of the liquid in the tank. Moreover, air enters the tank every time the temperature drops, and such air is not, generally, filtered with sufficient thoroughness by the sulfuric acid bubbling or absorbing means provided in the tank as mentioned above, so that the air is liable to contaminate the contents of the tank during storage. This explains why in some cases incipient fermentation has been found to occur in tanks after several months of sterile storage. Moreover, the emptying of such a tank must be effected all at once.

It has further been proposed to improve the storage conditions in sterile tanks by using an atmosphere of inert gas, e.g. nitrogen. The inert gas is maintained at superatmospheric pressure which inhibits any biochemical processes that may otherwise tend to occur in the presence of oxygen above the liquid surface. However, even when this added precaution is used, and no matter how carefully the initial tank filling operation under sterile conditions was performed, fermentation still may occur at any time during the storage period, with serious results unless immediately detected.

It is therefore an object of this invention to provide a means for storing fruit juice and the like in large-capacity tanks, in an atmosphere of inert gas, wherein the contents of the tank may be withdrawn as desired, without any danger of the inert gas escaping.

A further object of the invention is to provide means for detecting even a slight increase in internal pressure which is indicative of incipient fermentation.

In accordance with an aspect of the invention, the storage tank is maintained in permanent communication with a source of gas at constant pressure, whereby gas will automatically be drawn into the tank from time to time as may be required to maintain constant gas pressure in the tank, e.g. during partial withdrawal of the liquid contents, as well as to compensate for leakage and pressure variations on contraction and expansion of the liquid contents due to temperature change.

According to another feature of the invention, means are provided in the tank for detecting a high rate of pressure increase therein, which is indicative of incipient fermentation of the contents. It will be understood that such a pressure detector is only able to serve effectively as a fermentation detector in the plant of the invention because of the fact that a constant pressure is normally maintained therein by connection with the gas source.

The above and further objects and features of the invention will be more readily understood from the ensuing description made with reference to the accompanying drawings in which an exemplary embodiment of the invention is illustrated and wherein.

Figure 1:
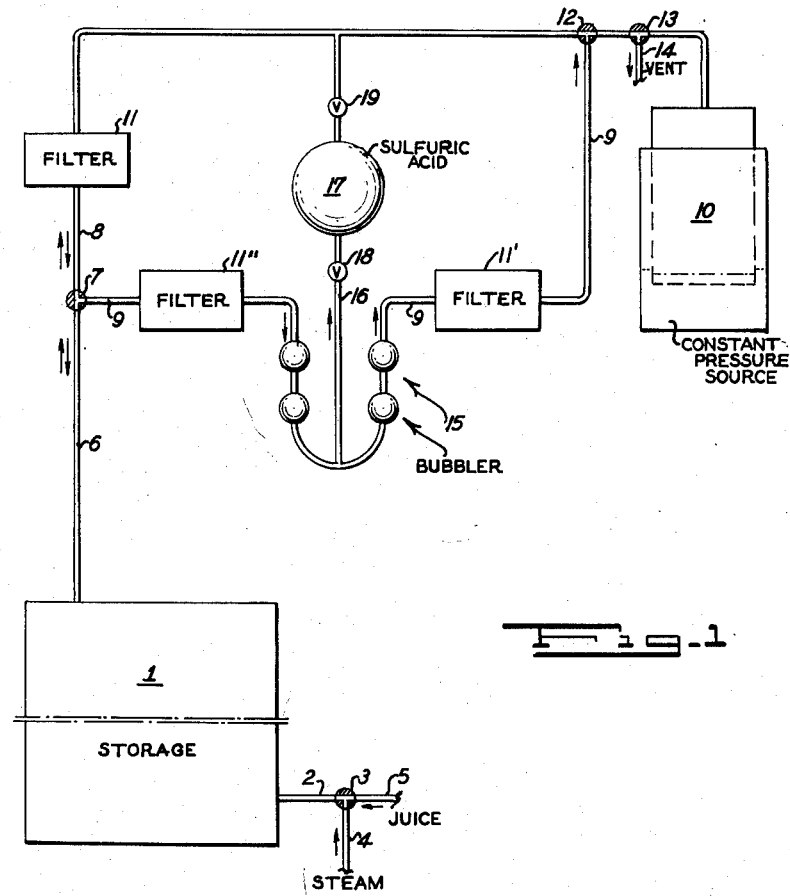
FIG. 1 is a schematic showing of the improved juice storing equipment.

As shown, a storage tank 1 may have any desired shape and size. A pipe 2 connected with the tank near the bottom of it is connectable by way of a three-way valve 3 selectively with a steam intake line 4 or with an intake line 5 for the juice to be stored in the tank. From the top of the tank extends a line 6 connectable by way of three-way valve 7 with either of two lines 8 and 9. Line 8 is connected at its remote end with a constant-pressure source, such as a generator or tank 10 of nitrogen (or other inert gas). Interposed in series in the line 8 is a sterilizing filter 11 capable of arresting germs and spores, and the two three-way valves 12 and 13. Valve 12 has its third opening connected with a branch line 9 and valve 13 has its third opening connected with an atmospheric vent pipe 14.

The branch line 9 leads through a filter 11' to one end of a U-shaped bubbler device 15 the other end of which is connected to a filter 11'' with the third opening of the afore-mentioned three-way valve 7 and the center of the bubbler is connected by a pipe 16 including a shutoff valve 18 therein with the bottom outlet of a container 17 containing sulfuric acid. The top of the container is connected with line 8 through a valve 19, whereby operation of valves 18 and 19 will control the rate of flow of sulfuric acid from container 17 into the bubbler. The bubbler assembly described serves to detect the flow of gas through the branch line 9.

In operation, the tank 1 and all the associated equipment and piping are first sterilized and for this purpose valve 3 is actuated to connect the line 2 with the steam pipe supply line 4, while valve 7 is adjusted to place tank outlet 6 in simultaneous communication with both lines 8 and 9. Valve 13 is adjusted to vent the line 8 to atmosphere at 14. In this condition, with the connections established as shown in the drawing, the air and vapour flowpath from the tank 1 follows the solid arrows shown.

On completion of the sterilizing period, valve 13 is turned to connect line 8 with the gas generator 10, valve 12 is turned to isolate line 8 from the branch line 9, and valve 7 is also turned to isolate line 8 from branch line 9. Nitrogen from gas generator or reservoir 10 now flows along the paths indicated by the broken-line arrows, and enters the tank 1 substantially at the pressure of reservoir 10, while being sterilized as it passes filters 11, 11' and 11''.

After a time sufficient to fill the entire plant with sterile nitrogen, valve 4 is turned to disconnect inlet 2 from the steam inlet line 4 and fruit juice under pressure is delivered through line 5 into the tank. The juice forces out the nitrogen gas back towards the source 10. When the level of juice within the tank 1 has reached the top of the tank, the three-way valve 7 is operated to cut off the filling circuit 8 and place the tank 1 in communication with the control or testing circuit 9. It is noted that the flow section area of this circuit is substantially smaller than that of the filling circuit and thus the flow resistance is higher. At this time, however, the valve 12 is positioned to cut off the test circuit from the line 8 and source 10. Valves 18 and 19 are then operated to their open position, causing sulfuric acid to flow into the bubbler unit 15. Valve 12 then is turned to place the line 9 in communication with the gas source 10. The system is now in its normal storage condition.

In this storage condition, a constant nitrogen pressure is thus maintained as determined by the pressure of source 10. A suitable range for the nitrogen pressure in tank 1 is from about 50 to 100 grams per sq cm. relative pressure. Any variations in the tank pressure, as may be due to variations in the volume of the liquid contents due to partial withdrawal of liquid, temperature changes, as well as to the small amount of nitrogen dilution in the liquid that may occur, are immediately compensated for by some nitrogen flowing into the tank 1 through the lines 8 and 9 in parallel. In normal operation, the flow resistance through the test circuit or line 9 is considerably higher than that through the main filling circuit or line 8, so that the rate of flow through bubbler 15 is comparatively low. The excessively high rate of increase in the flow through the bubbler, in excess of the amounts that may be due to normal temperature variations and the like, will indicate the presence of carbon dioxide gas pressure in the tank due to incipient fermentation. The tank 1 must then be drained out through bottom outlet 5.

Figure 2:
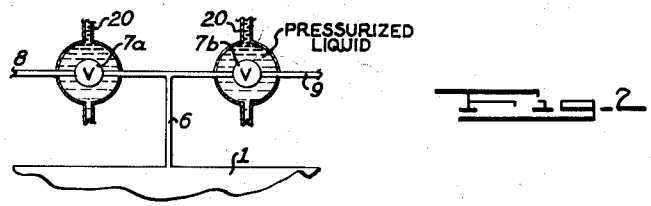
FIG. 2 is a schematic view of a detailed modification.

Instead of the three-way valves shown at 3, 7, 12 and 13 in FIG. 1, some or all of these valves, especially valve 7, may be replaced by pairs of two-way valves as shown for example in FIG. 2. As further shown in FIG. 2, each valve is preferably isolated from the exterior by a casing 20 which is filled with antiseptic liquid or vapour under a pressure of several atmospheres. Generally speaking the fluid-tightness of the various connections and valves and the protection against ingress of germs from the atmosphere should be effected with great care, though it will be understood that other means than those shown in FIG. 2 may be used for the purpose.

Various other changes may be made in the schematic plant illustrated without exceeding the scope of the invention.

What we claim is:

1. Apparatus for the sterile storage of fermentable liquids comprising storage means for storing said liquid, and means coupling said storage means to a source of gas at a substantially constant pressure to exert said pressure on the liquid, said gas being inert with respect to said liquid and preventing fermentation thereof, the latter said means including measuring means for measuring the pressure of said gas to detect fermentation and a feed line between said source and said storage means connected in parallel with the measuring means, the measuring means including a bubbling device for purifying the gas, and means for selectively controlling communication of the source of gas with the feed line and the measuring means.

2. Apparatus as claimed in claim 1 comprising sulfuric acid in said bubbling device.

3. Apparatus as claimed in claim 2 wherein the inert gas is nitrogen.

References Cited in the file of this patent

UNITED STATES PATENTS

| 2,004,611 | Kleinfelder | June 11, 1935 |
| 2,321,836 | Marzo | June 15, 1943 |
| 2,551,217 | Martin | May 1, 1951 |
| 2,899,884 | Herbruck | Aug. 18, 1959 |

FOREIGN PATENTS

| 356,844 | Great Britain | Sept. 17, 1931 |
| 416,632 | Great Britain | Sept. 18, 1934 |
| 1,201,246 | France | July 6, 1959 |